(12) United States Patent
Haney et al.

(10) Patent No.: US 6,778,131 B2
(45) Date of Patent: Aug. 17, 2004

(54) AUTOMOTIVE RADAR ELEVATION ALIGNMENT

(75) Inventors: Paul Robert Haney, Balsall Common (GB); Michael Julian Richardson, Redditch (GB); Edward George Hoare, Malvern (GB)

(73) Assignee: Jaguar Cars Limited, Coventry (GB)

( * ) Notice: Subject to any disclaimer, the term of this patent is extended or adjusted under 35 U.S.C. 154(b) by 0 days.

(21) Appl. No.: 10/203,128

(22) PCT Filed: Jan. 5, 2001

(86) PCT No.: PCT/GB01/00020

§ 371 (c)(1),
(2), (4) Date: Sep. 30, 2002

(87) PCT Pub. No.: WO01/57551

PCT Pub. Date: Aug. 9, 2001

(65) Prior Publication Data

US 2003/0090411 A1 May 15, 2003

(30) Foreign Application Priority Data

Feb. 2, 2000 (GB) .............................................. 0002294

(51) Int. Cl.$^7$ ........................... G01S 7/40; G01S 13/93; H01Q 1/00
(52) U.S. Cl. ........................ 342/174; 342/70; 342/165; 342/173; 343/703; 343/711
(58) Field of Search ........................ 343/711–717, 703; 342/5–11, 70, 71, 72, 165–175, 195, 80, 149, 150–154; 180/167, 168, 169; 701/300, 301

(56) References Cited

U.S. PATENT DOCUMENTS 5,313,213 A * 5/1994 Neumann et al. ........... 342/165
5,964,822 A * 10/1999 Alland et al. ................ 701/301
6,087,995 A * 7/2000 Grace et al. ................. 343/703
6,119,067 A * 9/2000 Kikuchi ....................... 701/300
6,329,952 B1 * 12/2001 Grace .......................... 343/703
6,335,705 B1 * 1/2002 Grace et al. ................. 343/703
6,363,619 B1   4/2002 Schirmer et al. ............. 33/288
6,437,731 B1 * 8/2002 Henrio et al. ................ 342/165

FOREIGN PATENT DOCUMENTS

| DE | 197 07 590 A1 | 9/1998 | ............ H01Q/3/08 |
| DE | 197 07 591 C1 | 10/1998 | ............ G01S/7/00 |
| DE | 197 36 307 A1 | 2/1999 | ............ H01Q/3/08 |
| EP | 0 0905 526 A1 | 3/1999 | ............ G01S/7/40 |
| GB | 2 238 871 A | 6/1991 | ............ G01C/3/00 |
| WO | 98/38691 | 9/1998 | ............ H01Q/1/12 |
| WO | 01/11387 A1 | 2/2001 | ............ G01S/13/93 |

* cited by examiner

*Primary Examiner*—Bernarr Earl Gregory
(74) *Attorney, Agent, or Firm*—Davis & Bujold, P.L.L.C.

(57) ABSTRACT

A method and an apparatus for aligning the elevation of an automotive radar unit. The method of aligning a radar transceiver unit (4) on a vehicle (1) having the steps of: positioning at least three radar reflectors (7, 8, 9) in a pattern in which the reflectors are fixed relative to one another with the reflectors occupying three rows (20, 21, 22) at different elevations and at least three different horizontal positions (23, 24, 25), so that the middle row (21) is horizontally distinguishable from the neighboring rows (20, 22); directing a beam (14) of radar waves (12) from the radar transceiver (4) generally towards the radar reflectors (7, 8, 9); scanning (18), and if necessary repeatedly scanning, the beam (14) relative to the pattern so that the beam moves across the pattern at one or more fixed elevations in a horizontal direction; receiving at the radar transceiver (4) radar waves reflected (17) from one or more of the reflectors (7, 8, 9); detecting the elevation of the middle row (21); setting the elevation of the beam (14) of radar waves according to the detected elevation of the middle row (21).

8 Claims, 3 Drawing Sheets

AUTOMOTIVE RADAR ELEVATION ALIGNMENT

The present invention relates to a method and an apparatus for aligning the elevation of an automotive radar unit.

Radar is used in various automotive applications, for example as part of a forwards directed collision warning system, or adaptive cruise control system. Usually, a radar transceiver unit that transmits and receives radar waves is mounted in a forwards location on the vehicle behind a bumper or body panel which is substantially transparent to the radar waves. In such systems, the radar beam may be fixed or laterally scanning, single-beam or multiple-beam, but is directed forwards above the road surface towards other vehicles or obstacles on or at the side of a roadway. It is important for the radar beam to be aligned with the correct elevation, or else the beam will be directed downwards at the road surface or upwards where it may intercept bridges or other structures above the road.

An initial elevation alignment is usually done in the factory after the vehicle has been assembled. One way of aligning the elevation is with an electronic spirit level on a reference surface such as a housing of a radar transmitter unit. The elevation needs to be aligned to an accuracy of about ±0.75°. Such manual alignment is time consuming and prone to human error.

It may also be necessary to align the radar beam in the horizontal direction, usually with respect to a longitudinal center line of the vehicle. When the radar beam is scanned symmetrically to either side of the center line. Usually the radar beam is projected forwards from a central portion of a molded plastic vehicle bumper, and scanned symmetrically to either side of the vehicle longitudinal axis. Azimuth alignment may be done electronically when the radar beam is scanned. For example, an azimuth offset corresponding to a known discrepancy between the middle of the scan and the vehicle longitudinal central axis may be applied to signals generated by the radar transceiver from detected returned radar waves. In many applications of automotive radar, this alignment must be performed to angle having an accuracy of less than or equal to ±0.1° to ±0.2°. It is difficult to achieve this level of accuracy while at the same time making an elevation alignment of an automotive radar transceiver unit.

It is an object of the present invention to provide a more convenient device and method for aligning the elevation, and optionally also the azimuth alignment, of an automotive radar unit.

Accordingly, the invention provides a method of aligning a radar transceiver unit on a vehicle, using at least three radar reflectors, comprising the steps of:

a) positioning the radar reflectors in a pattern in which the reflectors are fixed relative to one another with the reflectors occupying three rows at different elevations and at least three different horizontal positions, so that the middle row is horizontally distinguishable from the neighboring rows;

b) directing a beam of radar waves from the radar transceiver generally towards the radar reflectors;

c) scanning the beam relative to the pattern so that the beam moves across the pattern at one elevation in a horizontal direction;

d) receiving at the radar transceiver radar waves reflected from one or more of the reflectors;

e) detecting the elevation of the middle row, including repeating if necessary steps c) and d) at different elevations;

f) setting the elevation of the beam of radar waves according to the detected elevation of the middle row.

Normally, the vehicle will be positioned on a horizontal reference surface, with the longitudinal axis of the vehicle directed at least approximately towards the radar reflector pattern.

The pattern may be fixed relative to the vehicle, with the beam of radar waves being scanned horizontally across the pattern of radar reflectors, which may be mounted on a support in a plane at right angles to the vehicle longitudinal axis.

If the vehicle is positioned with a longitudinal center line of the vehicle aligned azimuthally (i.e. horizontally), but not necessarily vertically, with a radar reflector in the middle row, then the method may comprise additionally the steps of:

g) scanning the beam of radar waves over the pattern so that the beam moves across said reflector in a horizontal direction;

h) receiving at the radar transceiver radar waves reflected from said reflector;

i) detecting the point in the scan at which the reflector is in alignment azimuthally with the beam of radar waves to set the azimuth alignment of the scanned beam.

For example, it may be known that the reflector returns a maximum signal when the beam of radar waves is centered on the reflector. Then the center of the reflector would be placed either on or directly above or below the longitudinal center line of the vehicle.

In one embodiment of the invention, the elevation separation between the middle row and neighboring rows is such that in step d) the radar transceiver does not detect reflected radar waves from reflectors in said neighboring rows when the elevation of the beam of radar waves is at the elevation of the middle row. Then when no corresponding signal is received from the neighboring rows, while a signal is received from the middle row, it Is known that the elevation of radar beam is such that the beam is directed onto the middle row. The elevation can then be fixed. An advantage of this approach is that the separation of the neighboring rows from the middle row can be set such that the range of elevation over which no signal is returned from the neighboring rows corresponds with an allowable tolerance in the set elevation of the radar transceiver.

In an alternative embodiment, the elevation separation between the middle row and neighboring rows is such that the radar transceiver detects with equal reduced strength reflected radar waves from reflectors in said neighboring rows when the elevation of radar waves is at the elevation of the middle row. This has the advantage that it may be possible to set the elevation more accurately, as for most radar beam profiles there will be only one elevation at which the signals from neighboring rows are matched.

In one embodiment of the invention, there are at least five radar reflectors, the number of and/or horizontal separation between radar reflectors in each row serving after steps c) and d) to identify uniquely each row. For example, the middle row may contain just one reflector, and each neighboring row may contain a pair of reflectors, but with the separation between reflectors in each pair of reflectors being different. Then, if the beam of radar waves is horizontally scanned repeatedly with respect to the radar reflector pattern at various elevations, with each scan being conducted at the same speed, then the difference in time between the detection of a pair of the reflectors can be used to identify which of the neighboring rows of reflectors has been detected.

Also according to the invention, there is provided an apparatus for aligning a radar transceiver unit on a motor vehicle, comprising a motor vehicle with a radar transceiver that generates a beam of radar waves, at least three radar reflectors for reflecting the beam back to the radar transceiver when a reflector is illuminated by the beam, and means for scanning the beam relative to the pattern at one elevation in a horizontal direction, wherein: the radar reflectors are arranged in a pattern in which the reflectors are fixed relative to one another with the reflectors occupying three rows at different elevations and at least three different horizontal positions such that the middle row is horizontally distinguishable from the neighboring rows, so that the elevation of the beam of radar waves may be set according to the detected elevation of the middle row.

The invention will now be described by way of example, with reference to the accompanying drawings, in which.

Figure 1:
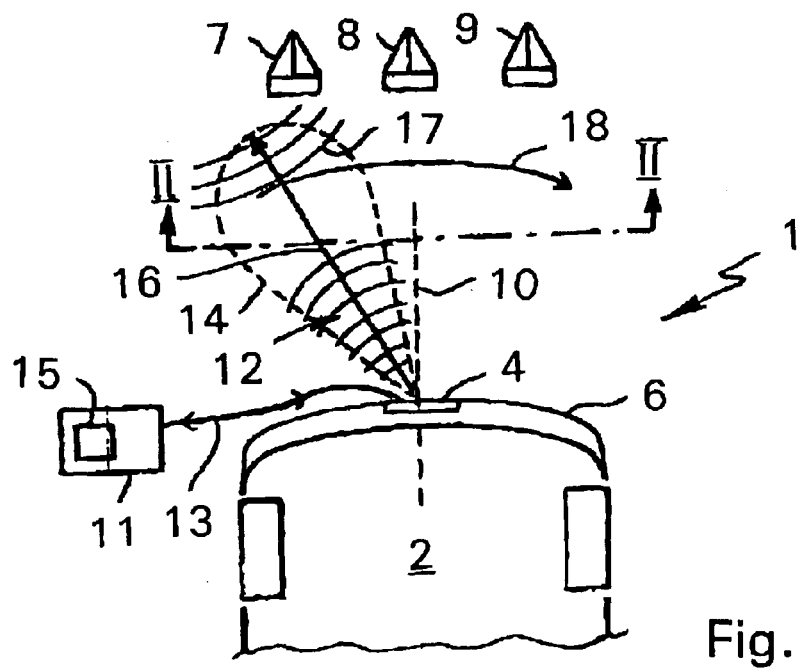
FIG. 1 is a schematic view looking down from above a first embodiment of an apparatus for performing the method according to the invention, showing a motor vehicle with a radar transceiver that projects a single-lobed beam of radar waves generally at a first pattern of radar reflectors.
Figure 2:
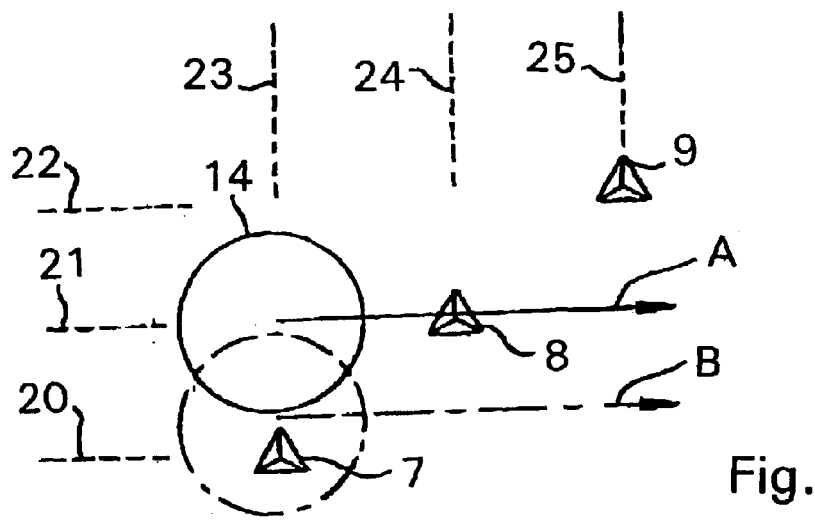
FIG. 2 is a view of the radar reflectors taken along the line II—II of FIG. 1.
Figure 4:
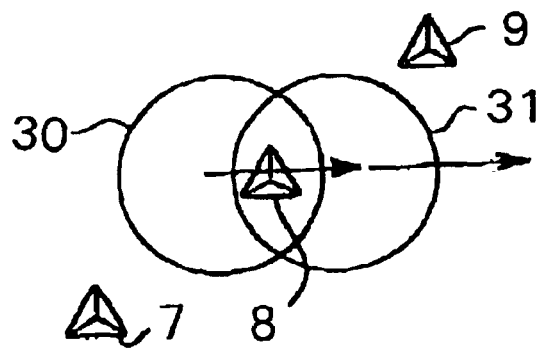
Figure 5:
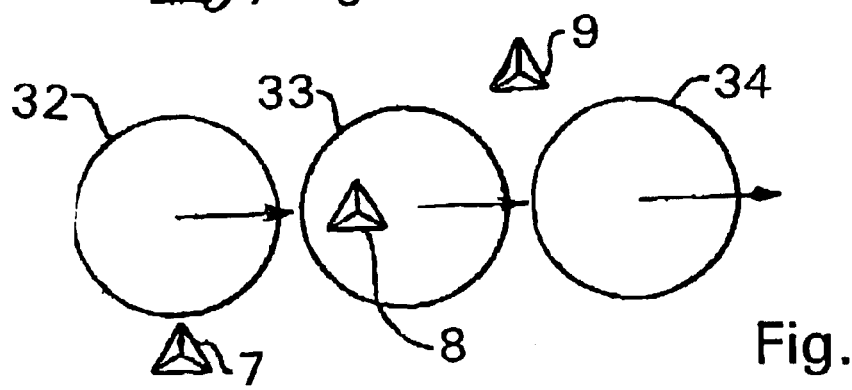
Figure 6:
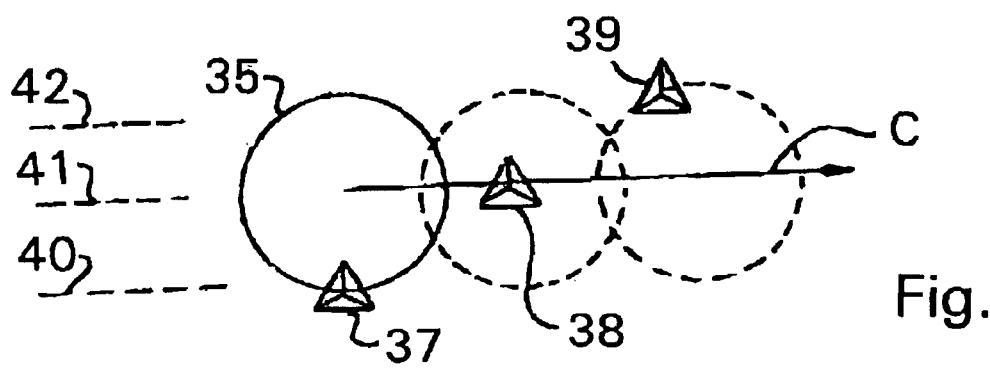
Figure 7:
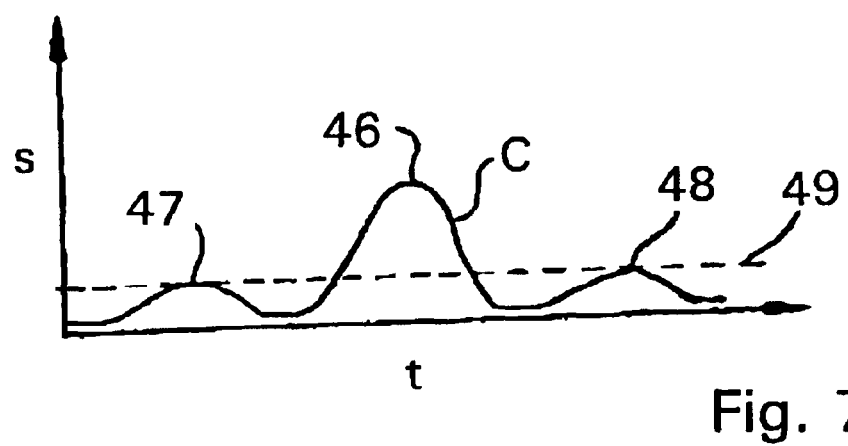
Figure 8:
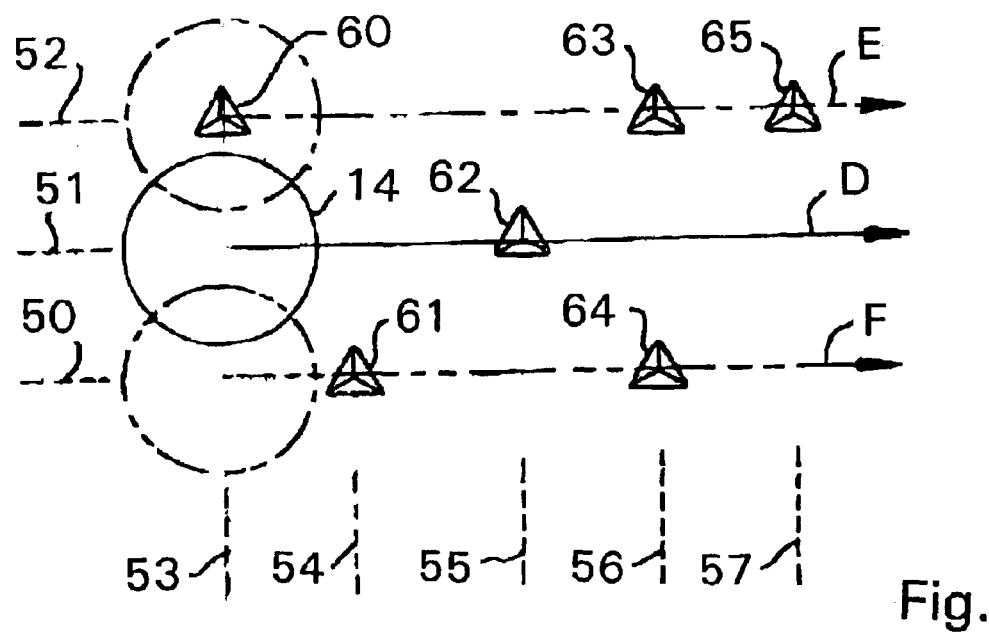
Figure 9:
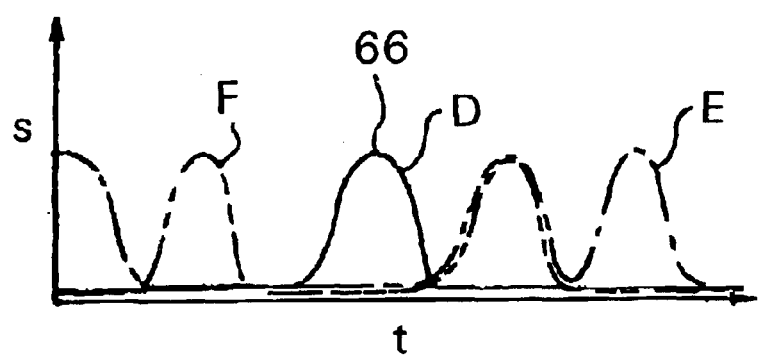

FIGS. 4 and 5 each show the first pattern of radar reflectors with different with different types of radar beam having more than one lobe of radar waves;

FIGS. 6 and 8 are schematic views further embodiments of an apparatus similar to that of FIGS. 1 and 2 for performing the method according to the invention, showing respectively second and third patterns of radar reflectors; and FIGS. 7 and 9 are respectively plots of a signal S(t) generated by the signal transceiver when the radar beam is scanned across the second and third patterns of radar reflectors.

FIGS. 1 and 2 show an apparatus 1 for aligning a radar transceiver unit on a motor vehicle, comprising a vehicle 2, here a motor car, with a radar transceiver unit 4 in a molded plastic front bumper 6 of the car 1, and spaced forwards of the bumper 6 three corner-cube radar reflectors 7,8,9. The radar transceiver unit 4 is centered on a longitudinal center axis 10 of the car 2.

The radar transceiver unit 4 generates radar waves 12 with an intensity distribution within a beam 14 having a single lobe directed in a direction indicated by arrow 16. The beam 14 can be scanned from the left to the right as indicated by arrow 18.

The method is not limited, however, to the case where the beam 14 of radar waves 12 is scanned, but is applicable also to the case where the beam 14 is fixed and the vehicle and/or radar reflectors 7, 8, 9 are moved horizontally relative to one another.

The elevation alignment process may be controlled by a suitable controller 11 linked by a cable 13 to the radar unit 4. The controller 11 can send signals that control the horizontal scan and, optionally also the elevation of the radar beam 14 if an actuator (not shown) is provided to vary the elevation angle of the radar unit 4. The controller may have a circuitry and a display 15 to display signals generated by radar reflections 17 returned from the reflectors 7, 8, 9.

As can be seen from FIG. 2, the three reflectors 7, 8, 9 are arranged diagonally with, as viewed from the radar unit 4, the left reflector 7 at a lowermost elevation, the middle reflector 8 at a middle elevation, and the right reflector 9 at an upper elevation. The three reflectors 7, 8, 9 can be thought of as being in three different rows 20, 21, 22 and in three different columns 23, 24, 25. In this case, the middle row 21 is horizontally distinguishable from the neighboring rows 20, 22 because each reflector 7, 8, 9 is at a different lateral spacing with respect to the vehicle longitudinal axis 10.

Figure 3:
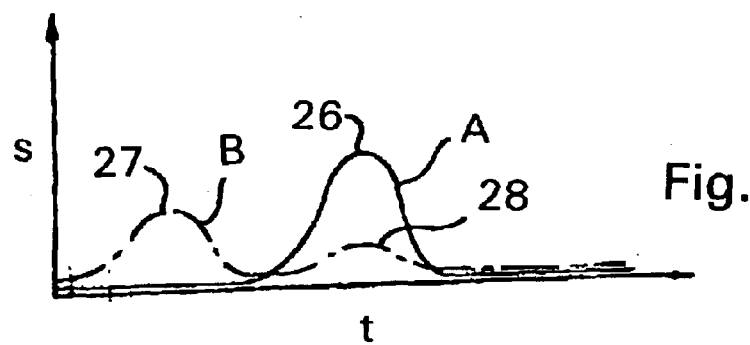
FIG. 3 is a plot of a signal S(t) generated by the radar transceiver when the radar beam is scanned across the first pattern at different elevations.

When the radar beam 14 is scanned horizontally 18 from left to right across the pattern of radar reflectors 7, 8, 9 at different elevations, as indicated by the arrows marked "A" and "B", then the radar beam 14 will detect different radar reflectors 7, 8, 9. This is shown in FIG. 3, which plots signal strength S(t) against the time of the scan t. Horizontal scan "A" is centered on the middle reflector 8 in horizontal row 21. The extent of the radar beam 14 and the vertical spacing of the neighboring reflectors 7, 9 from the middle row 21 is such that the radar beam 14 does not extend as far as the neighboring reflectors 7,9. Therefore, line "A" in FIG. 3 shows only one peak 26 from radar waves reflected by the middle reflector 8. In contrast, horizontal scan "B", which is above the level of the lower row 20, gives a signal in FIG. 3 with a moderate peak 27 corresponding with the lower left reflector 7, and a smaller peak 28 corresponding with the middle reflector 8. Therefore, if the elevation of the scanned radar beam 14 is changed while the signal resulting from reflected radar waves is observed, then it is possible to alter the elevation of the radar beam 14 until it corresponds with that shown in horizontal scan "A", in which there Is only one main peak 26. In performing this adjustment, it is necessary to identify from the signal S(t) peaks 26, 27, 28 showing reflectors in each of the rows 20, 21, 22. This allows the middle row 21 to be unambiguously identified.

FIGS. 4 and 5 show the same arrangement of three reflectors 7, 8, 9 but with different types of radar beam. FIG. 4 shows a radar beam with two lobes 30, 31, which may be a two-beam monopulse radar. FIG. 5 shows three separate non-overlapping radar beams 32, 33, 34. In both of the cases shown in FIGS. 4 and 5, the radar beam may be fixed, i.e. not scanning. In this case, the radar reflectors 7, 8, 9 may be moved relatively towards the left while the radar beams 30–34 are kept fixed.

FIG. 6 shows another embodiment of the invention, in which there is a radar beam with a single lobe 35. Here, three diagonally arranged radar reflectors 37, 38, 39 are arranged in three rows 40, 41, 42 with a spacing close enough so that the single lobed radar beam 35 overlaps both neighboring rows 40, 42 when this is scanned at the elevation of the middle row 41, as shown by the arrow "C".

FIG. 7 shows a signal S(t) which would be generated by such a scan. In this case, there is one central main peak 46 corresponding to the middle reflector 38, and on either side of this two minor peaks 47,48 corresponding to the neighboring reflectors 37, 39. When the elevation of the scanned radar beam 35 is equal to that of the middle reflector 38, then both minor peaks 47, 48 will be at the same level 49. This gives a sensitive measure that the elevation of the radar beam 35 is correctly set at the elevation of the middle reflector 38.

FIGS. 8 and 9 show yet another embodiment of the invention, in which six radar reflectors 60–65 are arranged in three rows 50, 51, 52 and five columns 53–57. The middle row 51 has just one reflector 62 while the lower row 50 has two reflectors 61, 64, and the upper row 52 has three reflectors 60, 63, 65. The arrangement is such that whenever a horizontal scan of the radar beam 14 is performed, as indicated by the arrows marked "D", "E" and "F", then the corresponding signal S(t) as shown in FIG. 9 will indicate unambiguously which row or rows 50, 51, 52 have been detected. This can speed up the process for aligning the radar beam 14 at the elevation of the middle row 51, as this is indicated by a signal having a single peak 66.

In all of the above embodiments, the central position of the peak 26, 46, 66 representing the middle reflector 8, 38, 62 can be used to set an azimuth alignment for the radar beam.

Once the radar beam is at the correct elevation, then this can be fixed in place, for example by setting set screws (not shown) to fix the radar unit 4 in place with respect to the vehicle 2.

The invention therefore provides a convenient apparatus and method of aligning a radar transceiver unit for on a vehicle 2. Optionally, the azimuth alignment can be made at the same time. This may be useful both in production of the vehicle 2, and also in servicing of the radar unit 4.

What is claimed is:

1. A method of aligning a radar transceiver unit on a vehicle, using at least three radar reflectors, comprising the steps of:
   a) positioning the radar reflectors in a pattern in which the reflectors are fixed relative to one another with the reflectors occupying three rows at different elevations and at least three different horizontal positions, so that the at least three reflectors arranged diagonally, so that the middle row is horizontally distinguishable from the neighboring rows;
   b) directing a beam of radar waves from the radar transceiver generally towards the radar reflectors;
   c) scanning the beam relative to the pattern so that the beam moves across the pattern at one elevation in a horizontal direction;
   d) receiving at the radar transceiver radar waves reflected from one or more of the reflectors;
   e) detecting the elevation of the middle row, including repeating, if necessary steps c) and d) at different elevations;
   f) setting the elevation of the beam of radar waves according to the detected elevation of the middle row.

2. The method as claimed in claim 1, in which the pattern is fixed relative to the vehicle, and the beam of radar waves is scanned horizontally across the pattern of radar reflectors.

3. The method as claimed in claim 2, in which a radar reflector in the middle row is aligned azimuthally with respect to a longitudinal center of the vehicle, the method comprising the steps of:
   g) scanning the beam of radar waves over the pattern so that the beam moves across said reflector in a horizontal direction;
   h) receiving at the radar transceiver radar waves reflected from said reflector;
   i) detecting the point in the scan at which the reflector is in alignment azimuthally with the beam of radar waves to set the azimuth alignment of the scanned beam.

4. The method as claimed in claim 1, in which the beam of radar waves is monopulse beam with two lobes.

5. The method as claimed in claim 1, in which the elevation separation between the middle row and neighboring rows is such that in step d) the radar transceiver does not detect reflected radar waves from reflectors in said neighboring rows when the elevation of the beam of radar waves is at the elevation of the middle row.

6. The method as claimed in claim 1, in which the elevation separation between the middle row and neighboring rows is such that the radar transceiver detects with equal reduced strength reflected radar waves from reflectors in said neighboring rows when the elevation of radar waves is at the elevation of the middle row.

7. The method as claimed in claim 1, in which there are at least five radar reflectors, the number of radar reflectors in each row serving after steps c) and d) to identify uniquely each row.

8. An apparatus for aligning a radar transceiver unit on a motor vehicle wherein the radar transceiver is capable of directing a beam of radar waves at a selected elevation and of scanning the beam of radar waves horizontally at the selected elevation and of indicating a pattern of reflected radar waves received during a scan of the beam of radar waves at the selected elevation, the apparatus for aligning the radar transceiver comprising:
   a plurality of radar reflectors for reflecting the beam of radar waves back to the radar transceiver, wherein
      the radar reflectors are arranged in a pattern in which the reflectors are fixed relative to one another with the reflectors occupying three rows at different elevations and at least three different horizontal positions, so that
         at least three reflectors are arranged diagonally, and
         the middle row is horizontally distinguished from the neighboring rows by the horizontal positions of the radar reflectors in the middle row, whereby
      the radar transceiver will indicate when the beam of radar waves is scanning the middle row of radar reflectors by identifying the middle row of reflectors, thereby indicating that the beam of radar waves is being scanned at a selected elevation that corresponds with the elevation of the middle row of radar reflectors.

* * * * *